E. HUNTER.
SPEED CONTROLLING MEANS.
APPLICATION FILED APR. 28, 1910.
998,005.
Patented July 18, 1911.
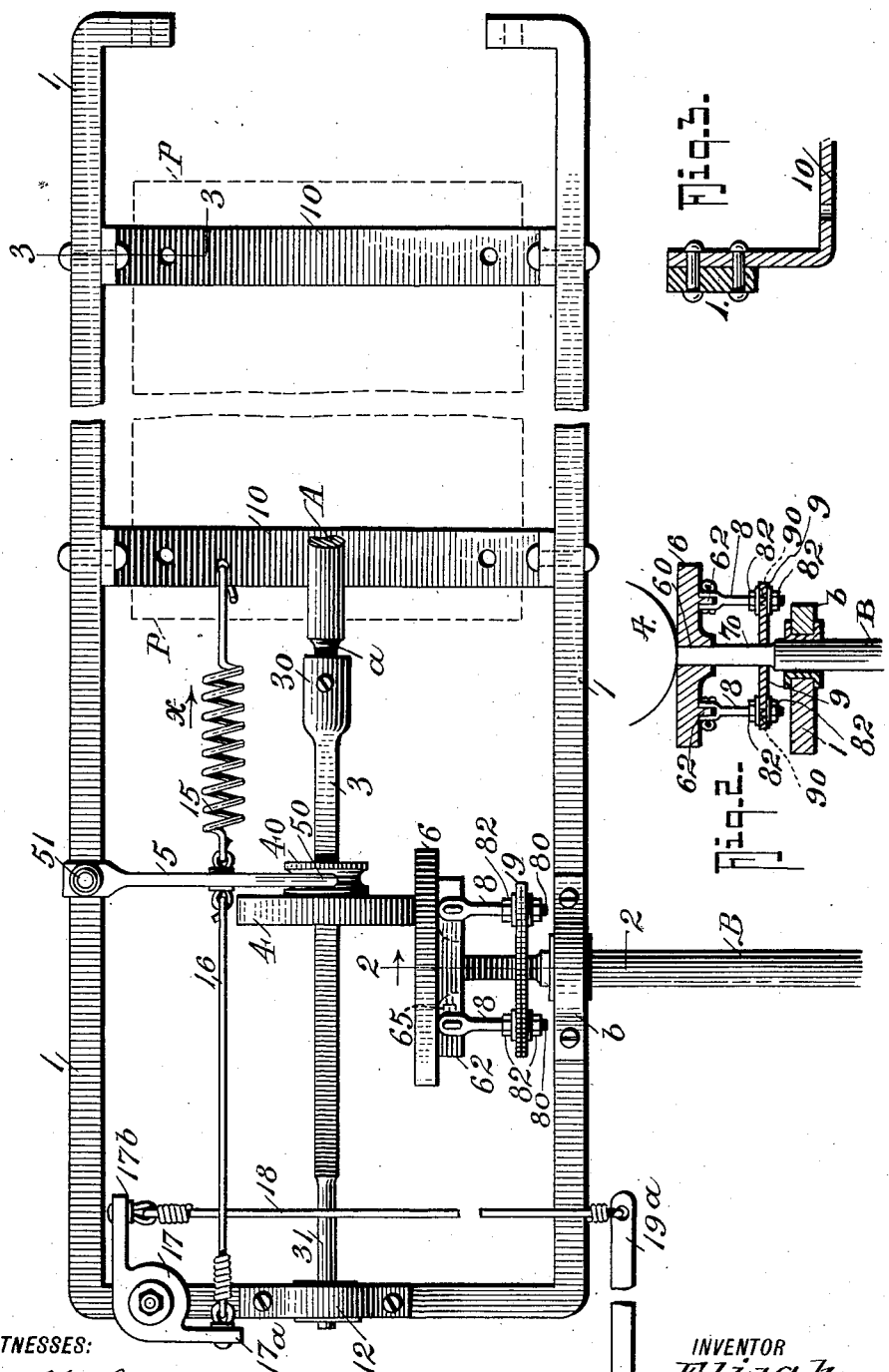

UNITED STATES PATENT OFFICE.

ELIJAH HUNTER, OF BOSTON, MASSACHUSETTS.

SPEED-CONTROLLING MEANS.

998,005.

Specification of Letters Patent. Patented July 18, 1911.

Application filed April 28, 1910. Serial No. 558,241.

*To all whom it may concern:*

Be it known that I, ELIJAH HUNTER, residing at Boston, in the county of Suffolk and State of Massachusetts, have invented a new and Improved Speed-Controlling Means, of which the following is a specification.

This invention, which, in its generic nature, relates to improvements in speed transmission mechanism, more particularly has for its purpose to provide a simple, inexpensive and easily operated friction gear mechanism that can be quickly and positively manipulated for controlling the speed of a shaft of a pump or other machine while running.

With other objects in view that will hereinafter appear, my invention consists in the novel construction and arrangement of parts hereinafter fully explained, specifically pointed out in the claims and illustrated in the accompanying drawing, in which:

Figure 1, is a plan view of my invention, the pump or other driven mechanism being indicated by dotted lines and part of the driving shaft thereof being shown in full lines. Fig. 2, is a transverse section of the same on the lines 2—2 on Fig. 1. Fig. 3, is a similar view on the line 3—3 on Fig. 1 and shows the saddle portion of the framing.

In the practical arrangement, my improved mechanism is more especially adapted for controlling the speed of pumps for motor vehicles and in such arrangement the pump shaft A is mounted at right angles to the engine shaft B, the latter having one end mounted in a journal box *b* on the side of a rectangular framing 1 that is attached to or forms a part of the main or motor frame, and which at one end has dropped cross beams 10—10 that form a saddle for the pump P indicated in dotted lines on the drawing.

One end *a* of the pump shaft A is reduced, as best shown in Fig. 1, and it is coupled with a socket 30 formed on one end of a supplemental shaft member 3 which forms, as it were, a continuation of the shaft A, the other end 31 of the said shaft member 3 being journaled in a bearing 12 on the outer or cross member of the framing 1. The shaft member 3 for a portion of its length is squared in cross section for slidably receiving the friction wheel 4 having a hub 40 for engaging the straddle or forked end 50 of a shifting lever 5 that is pivotally connected at 51 of the framing 1.

6 designates a friction or driving disk that engages the wheel and is formed with a non-circular axial opening 60 for engaging the end 70 of the engine shaft B, the said end being square in cross section.

It will be noticed by referring to Fig. 1 that since the friction wheel 4 engages the outer face of disk 6 that the motion from the engine shaft is transmitted through the members 4 and 6 to the pump shaft and by shifting wheel 4 from the center to the circumference of the disk 6, the speed of the pump shaft is materially increased while the engine shaft is running, thus providing a simple and effective means for getting a high speed for the pump while the motor car is climbing a steep hill and the engine is running slow but under heavy explosive force. At this point it should be mentioned that in a motor vehicle under the conditions stated, it is necessary for obtaining the desired power from the engine shaft that the set positions of the two friction members 4 and 6 remain positive and free from variable connection due to strain of contact of the said members.

My invention especially provides for maintaining a perfect setting of the said parts and for such purpose a special means is combined with the engine shaft and the disk 6 for holding the said disk firm and true on the engine shaft and other means combined with the sliding pulley 4 for holding it to its adjusted positions. To the said end the disk 6 has parallel flanges 62 to which connect the forked ends of combined adjusting and stay rods 8, the outer threaded ends 80 of which pass through apertures 90 in a plate 9 slidably mounted on the squared end of the shaft B and the said rods 8 have lock and jam nuts 82 that secure the rods 8 and disks 6 firmly on the shaft B. Disk 6 may be further secured on shaft B by a set screw 65 through the hub thereof, as shown.

For controlling the swinging lever 5 and holding it and the pulley 4 to the set positions I provide a stout coiled spring 15, one end of which is connected to one of the saddle beams and the other end is joined to the arm 5, it being obvious that the spring normally pulls the arm 5 in the direction of arrow *x*.

16 designates a rod or cable connected to the arm 5 and to one member 17ª of a bell crank lever 17 mounted on the framing 1, the other end 17ᵇ of which connects with a flexible member 18 that joins with the crank end 19ª of an upright rod 19 having a handle 19ᵇ disposed within convenient reach of the motorist.

From the foregoing, taken in connection with the drawing, the complete construction, the manner of operating and the advantages of my invention will be apparent.

By reason of having a spring coil pull at one side and a hand controlled lever pull on the other side of member 5, the said member 5 and the pulley 4 will be held substantially rigid to the set positions, thus maintaining the desired speed transmission from shaft B to shaft A, the change from slow to rapid being quickly effected by simply releasing the hold on the rod 19, as the spring almost instantly pulls the disk 4 to the circumference of disk 6, while the change from the high to the low speed is effected slower through the manipulation of the hand lever devices.

Having thus described my invention, what I claim and desire to secure by Letters Patent, is:—

1. In a mechanism of the character stated, a supporting frame having a bearing, a driving shaft mounted in said bearing, said driving shaft having a squared end, a plate mounted on said squared end, a driving disk mounted on said squared end, bolts secured to said plate and pinned to said disk, a driven shaft, a bearing on said frame for said driven shaft, a sliding friction disk on said driven shaft to engage said disk on said driving shaft, said sliding disk having a grooved portion, a pivoted lever having a fork to engage said grooved portion, a spring connecting said lever with said frame continuously tending to move it in one direction, and means for moving said lever in an opposite direction.

2. A frame, a driving shaft and a driven shaft mounted in said frame, a friction disk secured to said driving shaft, said friction disk having flanges, a plate slidably mounted on said driving shaft, combined adjusting and stay rods connecting said plate and disk, and a friction disk slidable on said driven shaft for engaging said disk on said driving shaft, and means for sliding said slidable disk along said driven shaft.

ELIJAH HUNTER.

Witnesses:
HENRY EDWARDS,
J. FRANCIS HENRY.